2,918,481
1-METHYL ANDROSTANE DERIVATIVES

Howard J. Ringold and George Rosenkranz, Mexico City, Mexico, assignors to Syntex S.A., Mexico City, Mexico, a corporation of Mexico No Drawing. Application June 3, 1957
Serial No. 662,993

Claims priority, application Mexico June 8, 1956

28 Claims. (Cl. 260—397.4)

The present invention relates to novel cyclopentanophenanthrene compounds and to a novel process for the production thereof.

More particularly the present invention relates to novel 1-methyl-androstane derivatives having 3-keto or 3-hydroxy groups, the 17-hydroxy group and a saturated ring A or the 5(10) or 3 double bond, as well as 3-esters or 3,17-diesters of these compounds.

In the U.S. application of Ringold, Sondheimer and Rosenkranz, filed April 5, 1955, Serial No. 499,528, there is disclosed the production of 1-methyl-3-methoxy-19-nor-$\Delta^{2,5(10)}$-androstadien-17$\beta$-ol as well as the production from this compound of novel 1-methyl-19-nor-$\Delta^4$-3-ketones of the androstane series.

In accordance with the present invention it has been discovered that from 1-methyl-3-methoxy-19-nor-$\Delta^{2,5(10)}$-androstadien-17$\beta$-ol or its esters there may be prepared upon treatment with a mild organic acid the novel corresponding 1-methyl-19-nor-$\Delta^{5(10)}$-androsten-17$\beta$-ol-3-one or the corresponding ester. These compounds are androgenic type hormones having a relatively great anabolic activity as compared to their androgenic activity. These compounds are also valuable intermediates for the production of other androgens having similarly a high anabolic to androgenic ratio. Thus reduction of 1-methyl-19-nor-$\Delta^{5(10)}$-androsten-17$\beta$-ol-3-one or its 17-ester with sodium borohydride gives the corresponding androgenic type hormones 1-methyl-19-nor-$\Delta^{5(10)}$-androsten-3,17$\beta$-diol or its 17-monoesters which can be conventionally esterified at C–3 to give the corresponding diesters.

Further treatment of 1-methyl-19-nor-$\Delta^{5(10)}$-androsten-17$\beta$-ol-3-one or its esters with strong alkali or acid gives 1-methyl-19-nor-testosterone and this compound upon reduction with sodium borohydride gives 1-methyl-19-nor-$\Delta^4$-androsten-3,17$\beta$-diol whereas the 17-ester of 19-nor-testosterone gives the corresponding 17-mono ester of the diol. Upon conventional esterification this last compound may be transformed into the corresponding diester.

When 1-methyl-19-nor-$\Delta^{5(10)}$-androsten-17$\beta$-ol-3-one or its esters are hydrogenated in the presence of a platinum group catalyst there is formed the corresponding 1-methyl-19-nor-androstan-17$\beta$-ol-3-one or its 17-ester and upon reduction with sodium borohydride the corresponding 1-methyl-19-nor-androstan-3,17$\beta$-diol or its 17-monoester which can be transformed into the 3,17-diesters upon conventional esterification. All of the foregoing novel compounds are hormones of the androgenic type as heretofore set forth.

A portion of the novel process of the present invention is exemplified in the following equation:

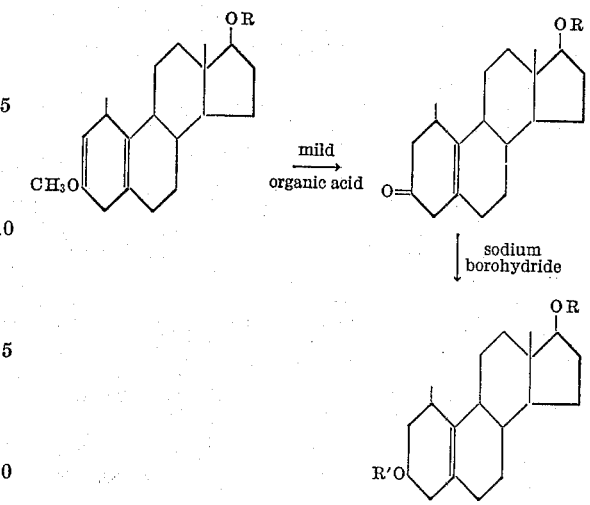

In the above equation both R and R' represent hydrogen or an acyl group derived from a hydrocarbon carboxylic acid of from 2 to 12 carbon atoms such as acetic, propionic, phenylpropionic, cyclopentylpropionic or benzoic.

In practicing the process above outlined, 1-methyl-3-methoxy-19-nor-$\Delta^{2,5(10)}$-androstadien-17$\beta$-ol or its 17-esters of the type set forth which may be prepared from the free compound by conventional esterification are dissolved in an organic solvent such as methanol and heated for a short time with an organic acid such as acetic. Upon separation and purification, the product was the corresponding 1-methyl-19-nor-$\Delta^{5(10)}$-androsten-17$\beta$-ol-3-one or its ester. These compounds were then dissolved in an organic solvent such as tetrahydrofurane and mixed with a reducing agent such as sodium borohydride and kept at room temperature to prepare the corresponding 3,17$\beta$-diol or its 17-mono esters. Conventional esterification with acid anhydrides or acyl chlorides gave the corresponding 3,17-diesters as above set forth.

Another portion of the process of the present invention may be exemplified by the following equation:

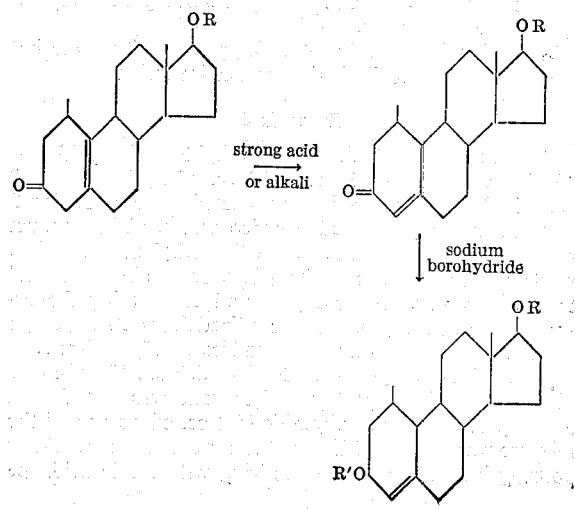

In the above equation R and R' represent the same groups as heretofore set forth.

In practicing the process outlined above the 1-methyl-19-nor-Δ⁵⁽¹⁰⁾-androsten-17β-ol-3-one or its 17-ester upon treatment with a strong acid or alkali as for example p-toluenesulfonic acid gives the corresponding 1-methyl-19-nor-testosterone. If the 17-monoester is saponified by this treatment it may be conventionally esterified to give the 17-monoester of 1-methyl-19-nor-testosterone. Treatment with sodium borohydride of 1-methyl-19-nor-testosterone or its 17-monoesters in a similar manner to the reduction previously set forth gave the corresponding 3,17β-diol or its 17-monoester. The diesters could then be prepared by conventional esterification of either the free diol or its 17-monoester.

Another portion of the process of the present invention is illustrated by the following equation:

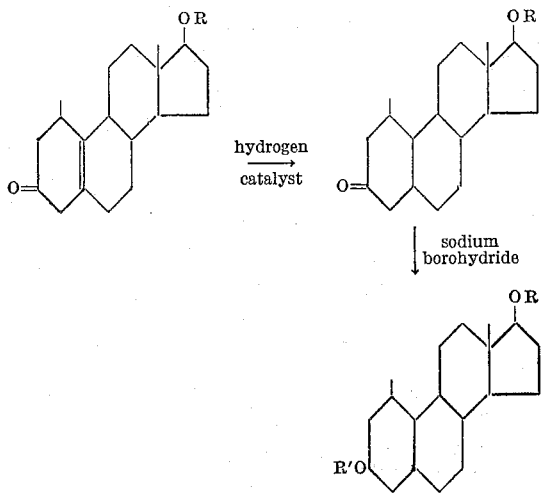

In the above equation R and R' represent the same groups as heretofore.

In practicing the process above outlined 1-methyl-19-nor-Δ⁵⁽¹⁰⁾-androsten-17β-ol-3-one or its 17-ester in an organic solvent such as methanol is treated with hydrogen in the presence of a platinum group hydrogenation catalyst such as 5% palladium on charcoal until 1 mol of hydrogen is absorbed. The catalyst is then removed and the product is recovered by evaporation of the solvent and purified as by crystallization from an organic solvent. The resultant product is 1-methyl-19-nor-androstan-17β-ol-3-one or the corresponding 17-ester.

For the second step of the process above outlined the product of the first step is reduced with sodium borohydride to the corresponding 3,17β-diol or the 17-monoester thereof. Conventional esterification with acid anhydrides or acyl chlorides of hydrocarbon carboxylic acids of the character hereinbefore defined gave the corresponding 3,17-diesters.

The following specific examples serve to illustrate but are not intended to limit the present invention.

Example I

A solution of 1 g. of 1-methyl-3-methoxy-19-nor-Δ²,⁵⁽¹⁰⁾-androstadien-17β-ol in 50 cc. of methanol and 2 cc. of glacial acetic acid was heated at 60° C. for 3 minutes and then poured into ice water. The product which separated was extracted with methylene dichloride, washed with aqueous sodium bicarbonate solution and then with water. After drying and evaporating the organic solvent, the product crystallized from ether-hexane to give 1-methyl-19-nor-Δ⁵⁽¹⁰⁾-androsten-17β-ol-3-one.

1 g. of 1-methyl-19-nor-Δ⁵⁽¹⁰⁾-androsten-17β-ol-3-one dissolved in 10 cc. of tetrahydrofurane was mixed with 300 mg. of sodium borohydride in 1 cc. of water and the mixture was kept for 4 hours at room temperature. After pouring into water and neutralizing with acetic acid, the product which precipitated was collected and crystallized from methanol-water, thus giving 1-methyl-19-nor-Δ⁵⁽¹⁰⁾-androsten-3,17β-diol.

A solution of 1 g. of 1-methyl-19-nor-Δ⁵⁽¹⁰⁾-androsten-17β-ol-3-one in 10 cc. of acetone was treated with 0.25 g. of p-toluenesulfonic acid and kept at room temperature for 15 hours. It was then poured into water, extracted with ethyl acetate, washed to neutral with water, dried over anhydrous sodium sulfate and evaporated to dryness. Crystallization afforded 1-methyl-19-nor-testosterone M.P. 202–207° C.

A solution of 1 g. of 1-methyl-19-nor-testosterone in 10 cc. of tetrahydrofurane was treated with 300 mg. of sodium borohydride in 1 cc. of water and the mixture was kept at room temperature for 4 hours. After pouring into water and neutralizing with acetic acid, the crude product was collected and crystallized from methanol-water, thus producing 1-methyl-19-nor-Δ⁴-androsten-3,17β-diol.

A solution of 1 g. of 1-methyl-19-nor-Δ⁵⁽¹⁰⁾-androsten-17β-ol-3-one in 30 cc. of methanol was treated with 100 mg. of 5% palladium on charcoal catalyst and stirred under an atmosphere of hydrogen until the equivalent of one mol of hydrogen had been absorbed. The catalyst was removed by filtration and the filtrate was evaporated to dryness. The residue was crystallized from ether-hexane to give 1-methyl-19-nor-androstan-17β-ol-3-one.

1 g. of 1-methyl-19-nor-androstan-17β-ol-3-one was dissolved in 10 cc. of tetrahydrofurane and mixed with 300 mg. of sodium borohydride in 1 cc. of water. The mixture was kept for 4 hours at room temperature, poured into water and neutralized with acetic acid. The crude product which separated was collected and recrystallized from methanol-water, thus yielding 1-methyl-19-nor-androstane-3,17β-diol.

Example II

A solution of 1 g. of 1-methyl-3-methoxy-19-nor-Δ²,⁵⁽¹⁰⁾-androstadien-17β-ol in 3 cc. of pyridine was treated with 1 g. of acetic anhydride for 1 hour on the steam bath. The reaction mixture was poured into water and the precipitate was filtered. The crude product was crystallized from methanol to produce the 17-acetate of 1 - methyl - 3 - methoxy - 19 - nor - Δ²,⁵⁽¹⁰⁾ - androstadien-17β-ol.

A solution of 1 g. of the 17-acetate of 1-methyl-3-methoxy-19-nor-Δ²,⁵⁽¹⁰⁾-androstadien-17β-ol in 50 cc. of methanol and 2 cc. of glacial acetic acid was heated at 60° C. for 3 minutes and then poured into ice water. The precipitated product was extracted with methylene dichloride and the resulting solution was washed with aqueous sodium bicarbonate solution and water. After drying and evaporating the organic solvent to dryness, the crude product was crystallized from ether-hexane to give the 17-acetate of 1-methyl-19-nor-Δ⁵⁽¹⁰⁾-androsten-17β-ol-3-one.

A solution of 1 g. of the 17-acetate of 1-methyl-19-nor-Δ⁵⁽¹⁰⁾-androsten-17β-ol-3-one in 10 cc. of tetrahydrofurane was mixed with 300 mg. of sodium borohydride in 1 cc. of water and kept for 4 hours at room temperature. The mixture was poured into water and neutralized with acetic acid. The crude product which precipitated was filtered and crystallized from methanol-water, thus affording the 17-acetate of 1-methyl-19-nor-Δ⁵⁽¹⁰⁾-androstene-3,17β-diol.

A solution of 1 g. of the 17-acetate of 1-methyl-19-nor-Δ⁵⁽¹⁰⁾-androsten-17β-ol-3-one in 10 cc. of acetone was treated with 0.25 g. of p-toluenesulfonic acid and kept for 15 hours at room temperature. The mixture was then poured into water, extracted with ethyl acetate, washed with water to neutral, dried over anhydrous sodium sulfate and evaporated to dryness. Crystallization from acetone yielded the 17-acetate of 1-methyl-19-nor-testosterone.

A solution of 1 g. of the 17-acetate of 1-methyl-19-nortestosterone in 10 cc. of tetrahydrofurane was treated with 300 mg. of sodium borohydride in 1 cc. of water and the mixture was kept for 4 hours at room temperature and then poured into water. After neutralization with acetic acid, the crude product was filtered and recrystallized from methanol-water, thus producing the 17-acetate of 1-methyl-19-nor-Δ⁴-androstene-3,17β-diol.

A solution of 1 g. of the 17-acetate of 1-methyl-19-nor-Δ⁵⁽¹⁰⁾-androsten-17β-ol-3-one in 30 cc. of methanol was stirred under an atmosphere of hydrogen in the presence of 100 mg. of a 5% palladium on charcoal catalyst until one mol of hydrogen had been absorbed. The catalyst was removed by filtration and the filtrate was evaporated to dryness. The residue crystallized from ether-hexane to yield the 17-acetate of 1-methyl-19-nor-androstan-17β-ol-3-one.

1 g. of the 17-acetate of 1-methyl-19-nor-androstan-17β-ol-3-one was dissolved in 10 cc. of tetrahydrofurane and treated with 300 mg. of sodium borohydride in 1 cc. of water. The mixture was kept for 4 hours at room temperature, poured into water and neutralized with acetic acid. The precipitated product was collected and recrystallized from methanol-water, thus giving the 17-acetate of 1-methyl-19-norandrostan-3,17β-diol.

By a similar sequence of steps other corresponding esters of the above compounds, such as the propionate, cyclopentylpropionate, and benzoate were also prepared.

Example III 1 g. of the 17-acetate of 1-methyl-19-nor-Δ⁵⁽¹⁰⁾-androsten-3,17β-diol in 3 cc. of pyridine was treated with 1 cc. of propionic anhydride. The mixture was heated for 1 hour on the steam bath and poured into water. The precipitate was recrystallized from ethanol to give the 3-propionate 17-acetate of 1-methyl-19-nor-Δ⁵⁽¹⁰⁾-androsten-3,17β-diol.

A solution of 1 g. of the 17-acetate of 1-methyl-19-nor-Δ⁴-androsten-3,17β-diol in 3 cc. of pyridine was treated with 1 g. of cyclopentylpropionyl chloride and heated for 1 hour on the steam bath. After pouring into water the precipitate was filtered and crystallized from methanol, thus giving the 3-cyclopentylpropionate, 17-acetate of 1-methyl-19-nor-Δ⁴-androstene-3,17β-diol.

A solution of 1 g. of the 17-acetate of 1-methyl-19-nor-androstan-3,17β-diol in 3 cc. of pyridine was mixed with 1 g. of benzoyl chloride and heated on the steam bath for 1 hour. After pouring into water, the product was crystallized from methanol to give the 3-benzoate-17-acetate of 1-methyl-19-nor-androstan-3,17β-diol.

A solution of 1g. of 1-methyl-19-nor-androstan-3,17β-diol in 3 cc. of pyridine was treated with 1 cc. of acetic anhydride and heated on the steam bath for 1 hour. The reaction mixture was poured into water and the product which precipitated was collected. Crystallization of the crude product from methanol afforded the 3,17-diacetate of 1-methyl-19-nor-androstan-3,17β-diol. By similar conventional esterification using other anhydrides and/or chlorides there was prepared the di-propionate, dibenzoate and di-cyclopentylpropionate.

We claim:

1. A process for the production of a compound selected from the group consisting of 1-methyl-19-nor-Δ⁵⁽¹⁰⁾-androsten-17β-ol-3-one and the 17-esters thereof of hydrocarbon carboxylic acids of from 2 to 12 carbon atoms comprising treating the corresponding 3-methoxy-Δ²,⁵⁽¹⁰⁾-compound with an organic acid under mild conditions.

2. A process for the production of a compound selected from the group consisting of 1-methyl-19-nor-Δ⁵⁽¹⁰⁾-androsten-3,17β-diol, 1-methyl-19-nor-Δ⁴-androsten-3,17β-diol, 1-methyl-19-norandrostan-3,17β-diol and the 17-esters thereof of hydrocarbon carboxylic acids of from 2 to 12 carbon atoms comprising reducing the corresponding 3-ketone compounds with sodium borohydride.

3. A process for the production of a compound selected from the group consisting of 1-methyl-19-nor-Δ⁴-androsten-17β-ol-3-one and 17-esters thereof of hydrocarbon carboxylic acids of 2 to 12 carbon atoms comprising treating the corresponding Δ⁵⁽¹⁰⁾-compound with a reagent selected from the group consisting of strong acids and strong bases.

4. The process of claim 3 wherein the reagent is p-toluenesulfonic acid.

5. A compound of the following formula:

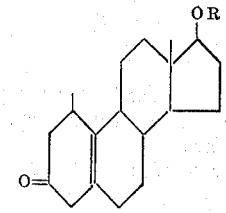

wherein R is selected from the group consisting of hydrogen and a hydrocarbon carboxylic ester group of 2 to 12 carbon atoms.

6. 1-methyl-19-nor-Δ⁵⁽¹⁰⁾-androsten-17β-ol-3-one.

7. The 17-acetate of 1-methyl-19-nor-Δ⁵⁽¹⁰⁾-androsten-17β-ol-3-one.

8. The 17-propionate of 1-methyl-19-nor-Δ⁵⁽¹⁰⁾-androsten-17β-ol-3-one.

9. The 17-esters of hydrocarbon carboxylic acids of from 2 to 12 carbon atoms of 1-methyl-3-methoxy-19-nor-Δ²,⁵⁽¹⁰⁾-androstadien-17β-ol.

10. A compound of the following formula:

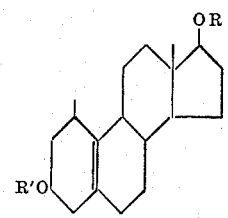

wherein R and R' are selected from the group consisting of hydrogen and a hydrocarbon carboxylic ester group of 2 to 12 carbon atoms.

11. 1 - methyl - 19 - nor - Δ⁵⁽¹⁰⁾ - androsten - 3,17β-diol.

12. The 17 - acetate of 1 - methyl - 19 - nor - Δ⁵⁽¹⁰⁾-androsten-3,17β-diol.

13. The 3 - propionate 17 - acetate of 1 - methyl - 19 - nor - Δ⁵⁽¹⁰⁾ - androsten - 3,17β - diol.

14. The 3,17 - diacetate of 1 - methyl - 19 - nor - Δ⁵⁽¹⁰⁾-androsten-3,17β-diol.

15. The 3,17 - dipropionate of 1 - methyl - 19 - nor - Δ⁵⁽¹⁰⁾-androsten-3,17β-diol.

16. A compound of the following formula:

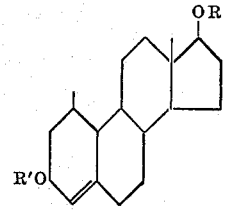

wherein R and R' are selected from the group consisting of hydrogen and a hydrocarbon carboxylic ester group of 2 to 12 carbon atoms.

17. 1-methyl-19-nor-Δ⁴-androsten-3,17β-diol.

18. The 17 - acetate of 1 - methyl - 19 - nor - Δ⁴ - androsten-3,17β-diol.

19. The 17 - propionate of 1 - methyl - 19 - nor - Δ⁴ - androsten-3,17β-diol.

20. The 3,17 - diacetate of 1 - methyl - 19 - nor - Δ⁴ - androsten-3,17β-diol.

21. The 3,17 - dipropionate of 1 - methyl - 19 - nor - Δ⁴-androsten-3,17β-diol.

22. The 3 - cyclopentylpropionate 17 - acetate of 1 - methyl-19-nor-Δ⁴-androsten-3,17β-diol.

23. A compound of the following formula:

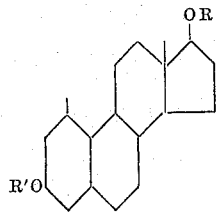

wherein R and R' are selected from the group consisting of hydrogen and a hydrocarbon carboxylic ester group of 2 to 12 carbon atoms.

24. 1-methyl-19-nor-androstan-3,17β-diol.

25. The 17-acetate of 1-methyl-19-nor-androstan-3,17β-diol.

26. The 17-propionate of 1-methyl-19-nor-androstan-3,17β-diol.

27. The 3,17-diacetate of 1-methyl-19-nor-androstan-3,17β-diol.

28. The 3,17-dipropionate of 1-methyl-19-nor-androstan-3,17β-diol.

References Cited in the file of this patent

UNITED STATES PATENTS

| | | |
|---|---|---|
| 2,280,828 | Inhoffen | Apr. 28, 1942 |
| 2,671,092 | Djerassi et al. | Mar. 2, 1954 |
| 2,721,871 | Colton | Oct. 25, 1955 |
| 2,723,280 | Inhoffen | Nov. 8, 1955 |